United States Patent [19]

Rhee

[11] 3,835,348

[45] Sept. 10, 1974

[54] TELEVISION RECEIVER DEFLECTION CIRCUITRY

[75] Inventor: Dong Woo Rhee, Williamsville, N.Y.

[73] Assignee: GTE Sylvania Incorporated, Stamford, Conn.

[22] Filed: Dec. 29, 1972

[21] Appl. No.: 319,512

[52] U.S. Cl. ............................................ 315/27 TD
[51] Int. Cl. ............................................ H01j 29/70
[58] Field of Search ......... 315/27 R, 27 TD, 26, 28, 315/29

[56] References Cited

UNITED STATES PATENTS

| | | | |
|---|---|---|---|
| 2,960,664 | 11/1960 | Brodwin | 343/18 E |
| 2,989,744 | 6/1961 | Pettit | 343/18 E |
| 3,404,310 | 10/1968 | Williams | 315/27 TD |
| 3,539,837 | 11/1970 | Stevens | 315/27 R |
| 3,604,828 | 9/1971 | Perkovich | 343/18 E |
| 3,699,575 | 10/1972 | Peters, Jr. et al. | 343/18 E |
| 3,727,096 | 4/1973 | Wilcox | 315/27 TD |

*Primary Examiner*—Maynard R. Wilbur
*Assistant Examiner*—J. M. Potenza
*Attorney, Agent, or Firm*—Norman J. O'Malley; Robert E. Walrath; Cyril A. Krenzer

[57] ABSTRACT

A deflection circuit adapted for monolithic integrated circuit construction with external power output transistors is shown. The circuit includes circuitry for matching the characteristics of the integrated circuit to the output transistors and circuitry for minimizing power consumption as well as circuitry for improving the transient response.

16 Claims, 7 Drawing Figures

TELEVISION RECEIVER DEFLECTION CIRCUITRY

CROSS-REFERENCE TO RELATED APPLICATIONS

D. W. Rhee, "Current Drive Deflection Apparatus Utilizing Constant Current Generator," application Ser. No. 44,476, filed June 8, 1970 now Pat. No. 3,710,171, D. W. Rhee et al., "Vertical Synchronizing Circuit," application Ser. No. 259,159, filed June 2, 1972 now Pat. No. 3,751,588, and D. W. Rhee, "Non-Saturating Oscillator and Modulator Circuit," Ser. No. 303, 227, filed Nov. 2, 1972; all assigned to the same assignee as the present invention.

BACKGROUND OF THE INVENTION

This invention relates to improved deflection circuitry for television receivers. In typical television receivers employing a cathode ray tube image display device the electron beam or beams in the cathode ray tube are deflected by appropriate deflection signals applied to horizontal and vertical deflection windings of a deflection yoke disposed in operable relation to the cathode ray tube. The deflection signals are synchronized with the composite video signal by synchronizing pulses contained therein to generate a coherent image on the cathode ray tube screen. Typical deflection circuitry includes an oscillator synchronized with the synchronizing pulses and waveshaping and driver circuitry connected between the oscillator and the deflection winding. The waveshaping and driver circuitry provides a generally sawtooth deflection current to the deflection winding to provide a linear trace across the screen and a rapid retrace.

Waveshaping and driver circuits using semiconductors are known in the prior art, however, such circuits generally consist of discrete components. Integrated circuits, while having numerous well-known desirable characteristics, have not been capable of providing sufficient power output for practical and economical waveshaping and driver circuits and of meeting other requirements of deflection circuits.

OBJECTS AND SUMMARY OF THE INVENTION

Accordingly, it is a primary object of this invention to provide improved cathode ray tube deflection circuitry capable of utilizing integrated circuitry.

It is a further object to provide circuitry for reducing the power consumption in a monolithic integrated circuit utilized in the deflection circuitry of television receivers.

It is a further object to provide circuitry for matching the characteristics of a monolithic integrated circuit to discrete power output transistors.

It is a still further object of this invention to provide deflection circuitry capable of providing sufficient retrace energy with reduced power consumption.

It is a still further object to provide deflection circuitry with improved transient response.

These and other objects and advantages are achieved in one aspect of this invention by improved deflection circuitry in a television receiver having a cathode ray tube and a deflection winding associated therewith for deflecting an electron beam therein. The deflection circuitry includes means for generating a signal with a sawtooth waveform, amplifier means for amplifying the signal, and first and second output transistors having control electrodes connected to the amplifier means.

In one aspect of this invention common electrodes of the output transistors are connected to respective terminals of a source of energizing potential and output electrodes are connected to one end of the deflection winding to provide a generally sawtooth signal during the trace periods and high amplitude retrace pulses upon the initiation of each of the retrace periods. Unidirectional conduction means connected in circuit with the one end of the deflection winding provide a current path for currents generated by the retrace pulses.

In another aspect of this invention the amplifier means and the first and second output transistors comprise a push-pull amplifier. A feedback means has a first impedance means connected between the output electrodes and a common junction of the pushpull amplifier for providing direct current feedback to the common junction and a second impedance means connected in circuit with the deflection winding and the common junction for providing a feedback signal to the common junction for opposing transients varying at a rate substantially less than the rate of scanning the cathode ray tube.

In another aspect of this invention the amplifier means comprises a push-pull amplifier having first and second sections included in a monolithic integrated circuit. The first and second output transistors are connected in series between first and second terminals of a source of energizing potential and have output electrodes connected to the deflection winding. First, second, and third impedance means are serially connected between the first and second terminals of the source. The junction between the first and second impedance means is connected to a first external connection of the monolithic integrated circuit for application of an energizing potential to the first section. The junction between the second and third impedance means is connected to a second external connection for application of an energizing potential to the second section whereby the power dissipation of the push-pull amplifier is lowered.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
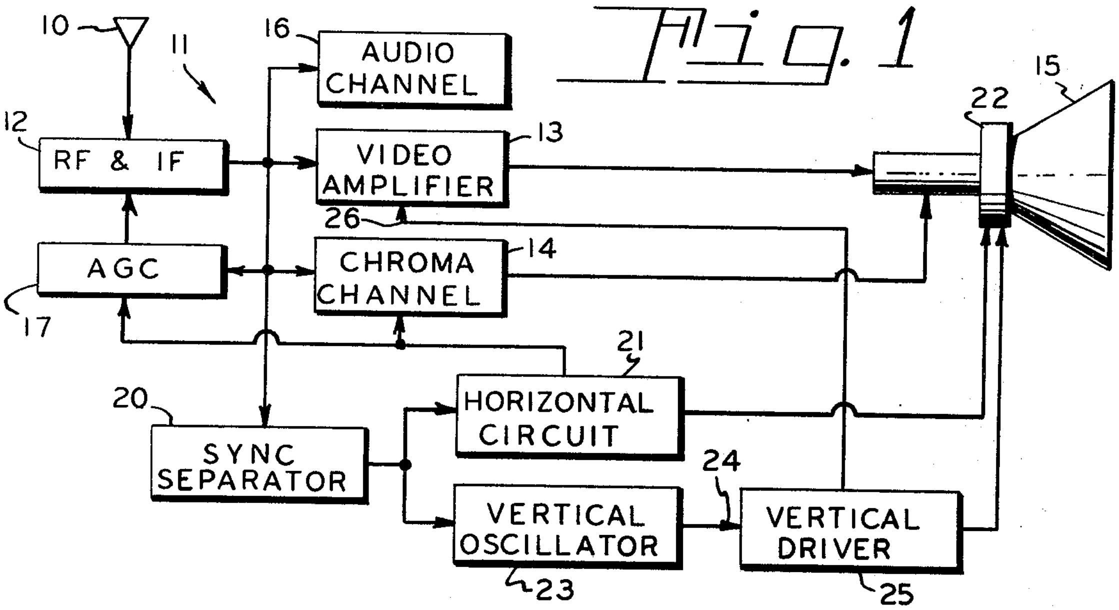
FIG. 1 is a block diagram of a television receiver for utilizing the invention.

In FIG. 1 a block diagram of a typical television receiver is shown. An antenna 10 receives or intercepts composite television signals which are coupled to a signal receiver 11. Signal receiver 11 includes a radio frequency (RF) tuner and intermediate frequency (IF) amplifier and detector 12 which provides a video signal to a video amplifier 13 and in the case of a color television signal at least the chrominance portion of the video signal to a chroma channel 14. Video amplifier 13 provides a luminance signal to a cathode ray tube (CRT) 15. Chroma channel 14 processes the chrominance signal to provide color signals or information to CRT 15. Other outputs of the IF amplifier and detector are coupled to an audio channel 16 and to an automatic gain control (AGC) circuit 17. AGC 17 provides gain control signals to the RF tuner and the IF amplifier in the usual manner.

Another output of the IF detector couples the composite video signal to a synchronizing pulse separator circuit 20 which separates the vertical and horizontal synchronizing pulses from the composite video signal. The synchronizing pulses are coupled to horizontal deflection circuitry 21 which provides a deflection signal of predetermined waveform to a horizontal deflection winding of a yoke 22 associated with CRT 15. Gating and/or blanking pulses are coupled from horizontal deflection circuit 21 to chroma channel 14 and AGC circuit 17 in the usual manner. At least the vertical synchronizing pulses are coupled to a vertical oscillator 23 which provides an output signal to an input 24 of a vertical driver 25. Vertical driver 25 provides a deflection signal of predetermined waveform to a vertical deflection winding of yoke 22 associated with CRT 15. The deflection windings deflect the electron beam or beams in CRT 15 in synchronism with the received composite video signal. Vertical driver 25 also couples blanking pulses to an input 26 of video amplifier 13.

Vertical oscillator 23 can be any suitable oscillator, however, the oscillator disclosed in copending application Ser. No. 303,227 is preferred. In one preferred form of the invention oscillator 23 and a portion of driver 25 were integrated in a single monolithic semiconductor form to provide highly compact, economical, and reliable vertical deflection circuitry. The vertical synchronizing circuitry disclosed in copending application Ser. No. 259,159 can also be used advantageously as or in place of oscillator 23. While the invention will be explained with reference to the vertical deflection circuitry of a television receiver and specific numerical examples will be used in the description, those skilled in the art will realize that the invention is not so limited.

Figures 4A, 4B, 4C, 4D:
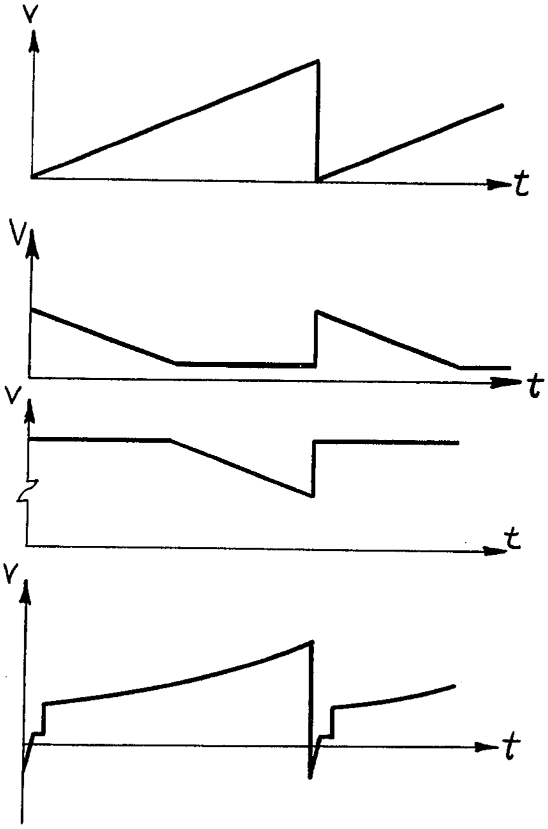
FIGS. 4A–4D are waveform diagrams to aid in explaining the operation of the invention.
Figure 2:
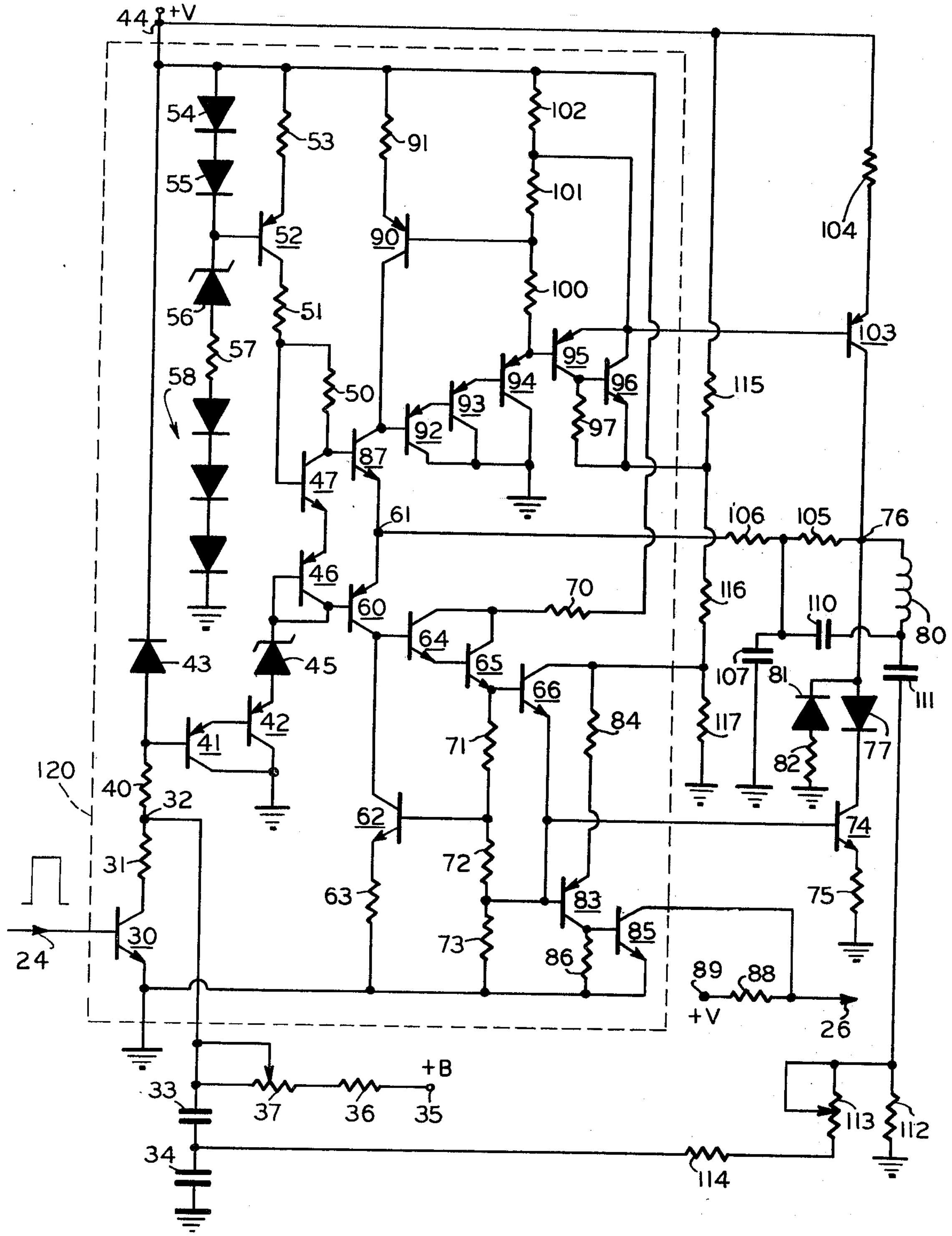
FIG. 2 is a schematic diagram of one embodiment of the invention.

In FIG. 2, vertical driver 25 is illustrated in detail. Input 24 is connected to a base of a transistor 30 which has an emitter connected to a common conductor illustrated as circuit ground. A collector of transistor 30 is connected via a resistor 31 to a junction 32. Junction 32 is connected by a capacitor 33 in series with a capacitor 34 to ground. A source of energizing potential illustrated as a terminal 35 is connected via a resistor 36 in series with a potentiometer 37 to junction 32. Transistor 30 and capacitor 33 together with oscillator 23 and their associated circuitry comprise a means connected to signal receiver 11 for generating a signal with a sawtooth waveform as illustrated in FIG. 4A.

In operation, during trace periods of the deflection of the electron beam in CRT 15, transistor 30 is nonconducting or OFF. Capacitors 33 and 34 charge through resistor 36 and potentiometer 37. Capacitor 34 is much larger than capacitor 33 so that capacitor 33 primarily controls the charging time constant. Preferably the charging time constant is long compared to the trace periods so that the sawtooth signal has substantially linear rise times. Potentiometer 37 can vary the charging time constant and thereby operates as a vertical height control. To initiate each retrace period of the electron beam deflection, oscillator 23 provides a pulse at the base of transistor 30 which switches transistor 30 ON to discharge capacitors 33 and 34 via resistor 31. For reasons that will become evident hereinafter, the fall times of the sawtooth waveform are substantially shorter than the retrace periods.

Junction 32 is further connected via a resistor 40 to an input circuit of an amplifier means. The input circuit includes a transistor 41 which has a base connected to resistor 40 and an emitter connected to a base of a transistor 42. The collectors of transistors 41 and 42 are connected to ground and the base of transistor 41 is further connected via a diode 43 to a source of energizing potential illustrated as a terminal 44. Source 44 has two terminals one of which can be circuit ground. An emitter of transistor 42 is connected by a zener diode 45 to a base of a transistor 46 which has an emitter connected to an emitter of a transistor 47. A collector of transistor 46 is connected to the base of transistor 46. A collector of transistor 47 is connected by a resistor 50 to a base of transistor 47 which is further connected via a resistor 51 to a collector of a transistor 52. An emitter of transistor 52 is connected by a resistor 53 to source 44 which is connected by series diodes 54 and 55 to a base of transistor 52. The base of transistor 52 is further connected via a zener dioder 56 in series with a resistor 57 and three diodes 58 to ground. Components 54–58 comprise a means to bias transistor 52.

The collector of transistor 46 is connected to a first input or section of a push-pull amplifier. The first push-pull amplifier section includes a transistor 60 which has an emitter connected to a common junction 61, a base connected to the collector of transistor 46, and a collector connected to a collector of a transistor 62. An emitter of transistor 62 is connected via a resistor 63 to ground. The collector of transistor 60 is connected to a base of a transistor 64 which has an emitter connected to a base of a transistor 65. An emitter of transistor 65 is connected to a base of a transistor 66 and the collectors of transistors 64 and 65 are connected via a resistor 70 to source 44. Series connected resistors 71, 72, and 73 comprise a resistance means connected between the base of transistor 66 and a potential reference such as ground. The junction between resistors 71 and 72 is connected to a base of transistor 62 while the junction between resistors 72 and 73 is connected to an emitter of transistor 66 and to a control electrode illustrated as a base of an output transistor 74. Transistor 66 is the driver transistor for the first section of the push-pull amplifier. A common electrode or emitter of transistor 74 is connected via a resistor 75 to ground. An output electrode illustrated as a collector of transistor 74 is connected to a junction point 76 via a diode 77. Junction 76 is connected to one end of a deflection winding illustrated as vertical deflection winding 80 of yoke 22 associated with CRT 15. A unidirectional conduction means illustrated as a diode 81 in series with a resistor 82 is connected between junction 76 and ground.

The emitter of transistor 66 is further connected to a base of a transistor 83 which has an emitter connected via a resistor 84 to a collector of transistor 66. A collector of transistor 83 is connected to a base of a transistor 85 and via a resistor 86 to ground. An emitter of transistor 85 is connected to ground and a collector is connected to input terminal 26 of video amplifier 13. Terminal 16 is further connected via a resistor 88 to a source of energizing potential illustrated as a terminal 89. Components 83–86 comprise a blanking circuit.

The collector of transistor 47 is further connected to a second input or section of the push-pull amplifier. The second push-pull amplifier section includes a transistor 87 which has an emitter connected to common junction 61, a base connected to the collector of transistor 47, and a collector connected to a collector of a transistor 90. An emitter of transistor 90 is connected via a resistor 91 to source 44. The collector of transistor 87 is further connected to a base of a transistor 92 which has an emitter connected to a base of a transistor 93. Transistor 93 has an emitter connected to a base of a transistor 94. Transistor 92, 93, and 94 have collectors connected to ground. An emitter of transistor 94 is connected to a base of a transistor 95 which has a collector connected to a base of a transistor 96 and an emitter connected to a collector of transistor 96. An emitter of transistor 96 is connected via a resistor 97 to its base. Series connected resistors 100, 101, and 102 comprise a resistance means connected between the base of transistor 95 and a potential reference such as source 44. The junction between resistors 100 and 101 is connected to a base of transistor 90. The junction between resistors 101 and 102 is connected to the emitter of transistor 95 and to a control electrode illustrated as a base of an output transistor 103. Transistors 95 and 96 comprise a composite or quasi-PNP driver transistor for the second section of the push-pull amplifier. A common electrode or emitter of transistor 103 is connected via a resistor 104 to source 44 and an output electrode illustrated as a collector is connected to junction 76. Thus, transistors 74 and 103 are connected in series between the first and second terminals of source 44 with the common junction connected to winding 80.

Junction 76 is connected to common junction 61 by an impedance means comprising resistors 105 and 106 series connected between junctions 76 and 61 and a bypass capacitor 107 connected between the junction of resistors 105 and 106 and ground. The end of deflection winding 80 opposite junction 76 is connected via an impedance means comprising a capacitor 110 to the junction of resistors 105 and 106. Components 106-107 and 110 comprise a feedback means connected from the output electrodes of transistors 74 and 103 and/or winding 80 to common junction 61.

The end of winding 80 remote from junction 76 is further connected via a coupling capacitor 111 in series with a resistor 112 to ground. The junction between capacitor 111 and resistor 112 is connected via a potentiometer 113 in series with a resistor 114 to the junction between capacitors 33 and 34. A pincushion correction circuit may be connected in circuit with winding 80 in a conventional manner, if desired.

Source 44 is connected in series with first, second, and third impedances such as resistors 115, 116, and 117 connected in series between terminal 44 and ground. The junction of resistors 115 and 116 is connected to the emitter of transistor 96. The junction of resistors 116 and 117 is connected to the collector of transistor 66.

In the preferred integrated circuit form of the invention at least the components included within dashed line 120 are integrated on a single monolithic semiconductor substrate. External connections are made to the power source, i.e., terminal 44 and circuit ground. An external connection to oscillator 23 at input terminal 24 may not be necessary if oscillator 23 is integrated on the same substrate. Other external connections are made between junction 32 and capacitor 33, between the collector of transistor 85 and terminal 26, between the emitters of transistors 66 and 95 and the bases of transistors 74 and 103, respectively, and between junction 61 and resistor 106. Resistors 115-117 are also preferably external to the IC with external connections being made from transistors 96 and 66 to the respective junctions of resistors 115–117.

Transistor 52 with fixed base and emitter biases is biased as a constant current source to provide current to transistors 47, 46, 41, and 42 and zener diode 45. Resistor 51 limits the maximum current through transistor 52 while resistor 50 determines the quiescent current of transistors 87 and 60. Transistors 46 and 47 act essentially as forward biased diodes and provide proper base biases for transistors 60 and 87, a bias differential of two diode drops as is common for push-pull amplifiers. Zener diode 45 is biased in its reverse breakdown region to provide a voltage reference for the biases at the bases of transistors 60 and 87. The sawtooth signal at junction 32, represented by the waveform of FIG. 4A, is coupled via Darlington connected emitter follower transistors 41 and 42 and via zener diode 45 and transistors 46 and 47 to the bases of transistors 60 and 87 which comprise the input stages of a Class B push-pull amplifier. Diode 43 protects against voltage transients or spikes at the base of transistor 41 by limiting the maximum amplitude of such spikes to a voltage not higher than source 44.

A quiescent current flows through transistors 90, 87, 60, and 62 since all of these transistors have a slight forward bias under quiescent conditions. This quiescent current is dependent primarily on the value of the resistances in the circuit, however, as an example for the purposes of explanation only, assume the quiescent current is about 40 microamp. The voltage waveform at the collector of transistor 60 is substantially that illustrated in FIG. 4B. The signal at the collector of transistor 60 is coupled through a current amplifier comprising transistors 64-66 to provide sufficient base drive for output transistor 74. The base biases of transistors 62 and 74 are approximately equal since resistors 71 and 72 are connected between the base and emitter of forward biased transistor 66 and the voltdrop across resistor 72 is small. Thus, the quiescent current through transistors 103 and 74 is primarily controlled by the ratio of resistors 63 and 75 and resistors 91 and 104. If this ratio is 1000:1, for example, the quiescent current through transistor 74 will be 40 ma when the quiescent current through transistor 62 is 40 microamp.

At the start of a trace period when the electron beam is scanning at the top of the CRT screen, transistors 60 and 64–66 conduct heavily to cause transistor 74 to conduct heavily. As the sawtooth signal at junction 32 increases, the conduction of transistors 60, 64–66, and 74 decrease until the electron beam reaches approximately the center of the screen where the conduction of transistors 60, 64–66, and 74 reach their quiescent conduction conditions.

During the time transistors 60, 64–66, and 74 are conducting, transistors 87, 92–96, and 103 conduct only their quiescent currents. As the sawtooth signal at junction 32 further increases, transistor 87 begins conducting additional current to provide a signal with the waveform of FIG. 4C at its collector. It should be noted that the waveform of FIG. 4C is not drawn to scale. This signal is amplified by the current amplifier comprising transistors 92–96 to provide sufficient base drive for output transistor 103. As the conduction of transistor 103 increases, the electron beam is deflected by winding 80 from the central portion of the screen of CRT 15 to the bottom. Note that transistors 95 and 96 comprise a quasi-PNP driver stage and that the current amplifier including transistors 92–96 has more stages than the current amplifier including transistors 64–66 because in IC form PNP transistors generally have a lower gain than NPN transistors.

At the end of the trace period the voltage at junction 32 abruptly falls to a low value to cause reversal of the conducting states of the transistors comprising the push-pull amplifier and of output transistors 74 and 103. This reversal of conducting states abruptly reverses the current through winding 80 to cause the electron beam to retrace to the top of the screen. Source 44 must have a sufficiently high voltage to provide sufficient retrace energy to winding 80. The power dissipation of transistors 74 and 103 is directly related, however, to the voltage of source 44. To minimize the power dissipation of output transistors 74 and 103 it is highly desirable to provide means to impart sufficient retrace energy to winding 80 while decreasing the voltage of source 44.

The sawtooth voltage at junction 32 has a very sharp fall time much shorter than the retrace period thereby causing a rapid reversal of the conducting states of transistors 74 and 103 upon the initiation of each retrace period. Thus, di/dt across winding 80 is very large with a short period when retrace is initiated to provide sufficient retrace energy to winding 80. The abrupt current change in winding 80 produces retrace pulses of an opposite polarity or negative pulses at junction 76. The unidirectional conduction means comprising diode 81 and resistor 82 provide a current path for the retrace current and cooperate to limit the negative voltage at junction 76 to a desired level. The additional power required to be dissipated during retrace is dissipated by diode 81 and resistor 82, but since they conduct only for a short period during retrace, the average power dissipation is low. Diode 77 protects transistor 74 from damage during retrace. The voltage at junction 76 has the general waveform illustrated in FIG. 4D to provide a generally sawtooth trace current through winding 80 and negative spikes during the first part of the retrace periods.

The sawtooth current through winding 80 is also coupled through current sensing resistor 112. The sawtooth voltage across resistor 112 is coupled through potentiometer 113 and resistor 114 to capacitor 34 which integrate the sawtooth voltage to provide a generally parabolic correction voltage across capacitor 34. This correction voltage provides linearity correction of the sawtooth voltage developed across capacitor 33 to provide a linearity corrected sawtooth voltage at junction 32. The amount of linearity correction is controlled by potentiometer 113.

During retrace transistor 66 turns ON hard or saturates to turn transistor 83 OFF thereby turning transistor 85 OFF to provide a positive blanking pulse at terminal 26 to blank video amplifier 13. After the end of the retrace interval transistor 66 is in an active mode and transistors 83 and 85 are turned ON.

At common junction 61 between two sections of the push-pull amplifier, the voltage waveform is similar to that illustrated in FIG. 4A but the dc level is more positive. Resistors 105 and 106 provide dc feedback to stabilize the quiescent operating points of junctions 61 and 76 at a desired voltage intermediate the voltage of the terminals of source 44. Capacitor 107 is an ac bypass capacitor which prevents signals at the scanning rate or of high frequency from being coupled between junctions 61 and 76. Assume that transistor 74 tends to conduct more than transistor 103 so that the voltage at junction 76 tends to go toward ground potential thereby causing current to flow from junction 61 to junction 76. This current flow through resistors 105 and 106 causes a differential in the quiescent currents of transistors 60 and 87 which in turn balances the conduction of transistors 74 and 103 to stabilize the quiescent voltage at junction 76. Similarly, if the voltage at junction 76 tends to increase because transistor 103 conducts more, current flow from junction 76 to junction 61 causes a differential in the quiescent currents of transistors 60 and 87 of the opposite sense.

It has been found that transients may be present in the sawtooth signal at junction 32. Such transients may occur, for example, when channels are changed and the vertical deflection system is forced to synchronize with a different video signal or due to noise which causes oscillator 23 to provide irregular pulses at input 24. Because transistors 74 and 103 act essentially as high impedance current drivers which underdamp winding 80 and capacitor 111, the transient at junction 32 causes low frequency rining of winding 80 and capacitor 111 to cause the raster on the screen of CRT 15 to slowly move up and down. This ringing or transient which also exists at the junction between winding 80 and capacitor 111 is coupled via capacitor 110 to the junction of resistors 105 and 106 and hence to junction 61. Capacitor 110 and resistor 106 thus provide an ac feedback signal from winding 80 to junction 61 to oppose the transient due to the ringing. Capacitor 107 is of sufficient size so that the feedback current through capacitor 110 varies the bias on capacitor 107 at the rining of transient rate. Thus, capacitor 107 passes the feedback signal at the transient rate.

In typical prior art drivers, driver transistors 66 and 95–96 dissipate the necessary power required to drive output transistors 74 and 103. In IC form, however, sufficient power handling capabilities are not readily available because of the limited power capabilities of integrated circuits. Resistors 115–117 establish bias potentials intermediate the potentials of source 44, i.e., +V and ground. Thus, the bias voltages of transistor 66 and quasi-PNP transistor 95–96 are lowered to lower the power dissipation of the driver transistors. The additional power required is dissipated by resistors 115–117 thereby dissipating part of the required power outside the IC. Resistors 115–117 can be of equal or unequal size depending upon the bias potentials desired.

As was indicated above, the base biases for transistors 62 and 74 are substantially equal so that the current ratio of transistor 62 and 74 is primarily determined by the ratio of resistors 63 and 75. The base-to-emitter offset voltage $V_{BE}$ of a transistor in IC form is typically higher than $V_{BE}$ for a power transistor such as transistor 74. Resistors 71–73 compensate for this $V_{BE}$ differential to maintain the desired current ratio. The voltage across resistors 71 and 72 is controlled or fixed because they are connected between the base and emitter of transistor 66 and the base-to-emitter voltage of transistor 66 cannot exceed about 0.6 volt. Thus, the voltdrop across resistor 72 is almost constant and equal to the difference of the base-to-emitter voltages of transistors 62 and 74 thereby providing a constant offset balance to compensate for the $V_{BE}$ difference. Similarly, resistors 100–102 compensate for $V_{BE}$ differences between transistors 90 and 103.

Figure 3:
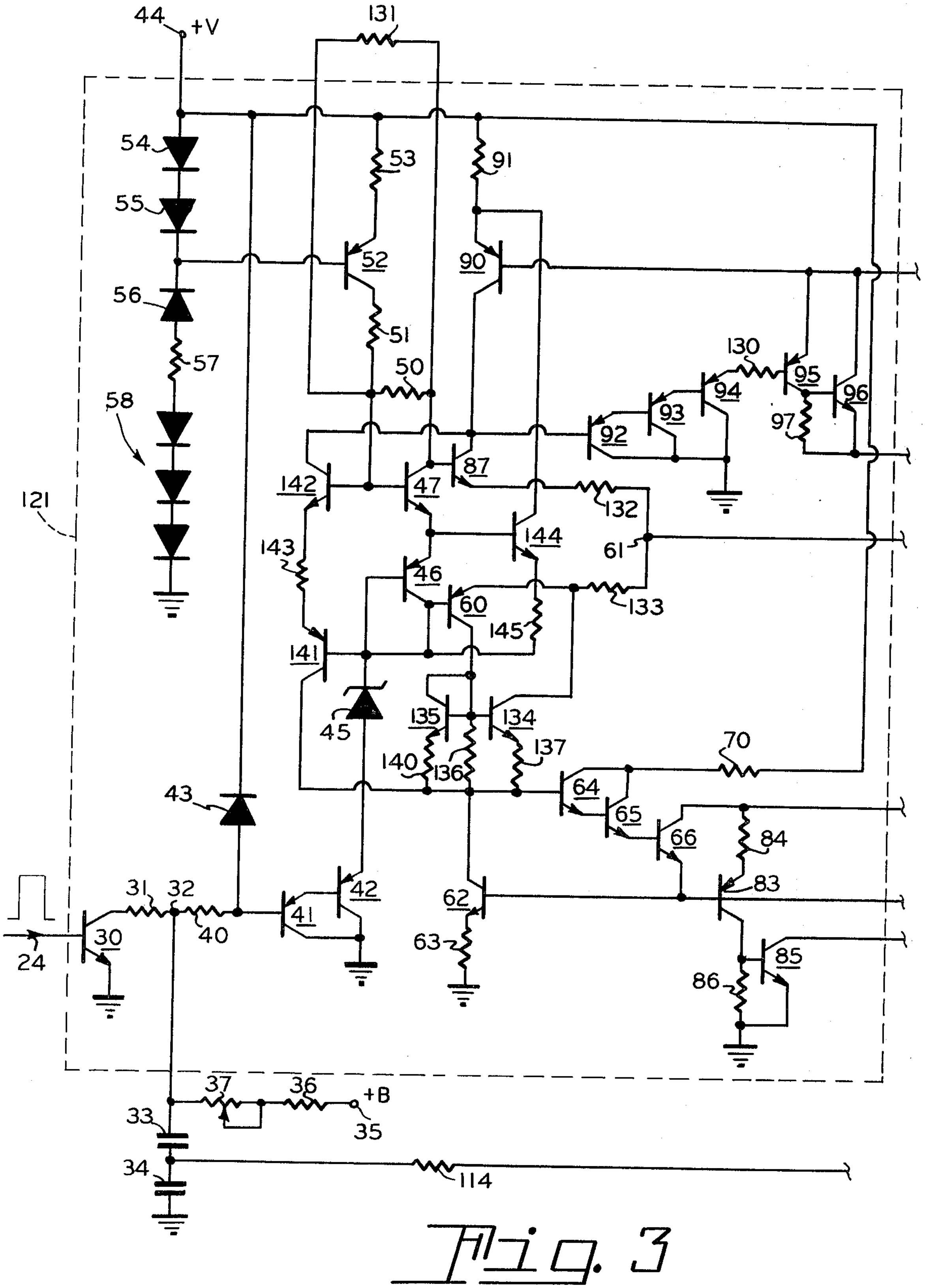
FIG. 3 is a schematic diagram of a second embodiment of the invention.

In FIG. 3 a second embodiment of the integrated circuit portion of the invention is illustrated. Integrated circuit 120 of FIG. 2 and integrated circuit 121 of FIG. 3 are substantially the same and similar components are numbered the same. External connections to transistors 74 and 103, resistors 115–117, and the feedback network connected to junction 61 are the same. Integrated circuit 121 of FIG. 3, however, is of a somewhat different form and only the differences will be explained in detail. Resistors 71–73 have been deleted in the embodiment of FIG. 3 and the bases of transistors 62 and 83 are both connected directly to the emitter of transistor 66. Resistors 100–102 have also been deleted and the base of transistor 90 is directly connected to the emitter of transistor 95. A resistor 130 is connected between the emitter of transistor 94 and the base of transistor 95 to limit the maximum current flow through transistor 94. An external resistor 131 is connected in parallel with resistor 50. Resistor 50 controls the quiescent bias current of transistors 60 and 87. Resistor 131 provides external control of the quiescent current to assure proper tolerances. A resistor 132 is added between the emitter of transistor 87 and junction 61. A resistor 133 is added between junction 61 and the emitter of transistor 60.

As was noted above, the gain of PNP transistors in IC form is usually lower than the gain of NPN transistors. In order to match the gains of transistors 60 and 87, transistors 134 and 135 can be added to provide, together with transistor 60, a composite or quasi-PNP to closely match the gain of transistor 87. The collector of transistor 60 is connected to the bases of transistors 134 and 135 and by a resistor 136 to the base of transistor 64. A collector of transistor 134 is connected to the emitter of transistor 60 while an emitter of transistor 134 is connected by a resistor 137 to the base of transistor 64. A collector of transistor 135 is connected to its base and an emitter is connected by a resistor 140 to the base of transistor 64. Transistor 135 is connected to operate as a diode and by shunting bias resistor 136 operates to control the gain of the composite PNP transistor.

In the embodiment of FIG. 2 leakage currents may be coupled through the current amplifiers comprising transistors 64–66 and 92–96 which may cause parasitic oscillations because of the high current gain of the current amplifiers. To prevent such oscillations transistors 141 and 142 are added. A base of transistor 141 is connected to the base of transistor 46, a collector is connected to the collector of transistor 62, and an emitter is connected by a resistor 143 to an emitter of transistor 142. A base of transistor 142 is connected to the base of transistor 47 and a collector is connected to the collector of transistor 90. Thus, transistors 141 and 142 are biased by transistors 46 and 47 at slightly different biases than transistors 60 and 87. A small current, for example 12 microamp, flows through resistor 143. This current also flows through transistors 90 and 62 in addition to the previously described quiescent current. This additional quiescent current holds the current amplifiers in an active mode at all times thereby preventing parasitic oscillations. Thus, the push-pull amplifier of FIG. 3 tends toward Class AB operation rather than strict Class B operation.

A transistor 144 has a base connected to the emitters of transistors 46 and 47, a collector connected to the emitter of transistor 90 and an emitter connected by a resistor 145 to the collector of transistor 46. The purpose of transistor 144 is to compensate for differences between transistors 62 and 90 by providing a small additional current flow through resistor 91.

Accordingly, there has been shown and described improved deflection circuitry for deflecting an electron beam in a cathode ray tube. The improved deflection circuitry is capable of utilizing integrated circuitry and includes provisions for reducing the power consumption in such integrated circuitry and for matching the characteristics of such circuitry to discrete power output transistors. Additionally, circuitry in accordance with the invention has the capability of providing sufficient retrace energy with reduced power requirements and of improving the transient response.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a television receiver having a signal receiver for developing a video signal from a received signal, a cathode ray tube connected to said signal receiver, and a deflection yoke having a deflection winding associated with said cathode ray tube for deflecting an electron beam therein, improved deflection circuitry comprising:

means connected to said signal receiver for generating a signal with a sawtooth waveform having substantially linear rise times corresponding to trace periods of the deflection of said electron beam and fall times shorter than corresponding retrace periods of the deflection of said electron beam;

amplifier means connected to said means for generating a signal with a sawtooth waveform for amplifying said signal with a sawtooth waveform;

first and second output transistors having control electrodes connected to said amplifier means, common electrodes connected to respective terminals of a source of energizing potential, and output electrodes connected to one end of said deflection winding, said amplifier means controlling the conduction of said first and second transistors to provide a generally sawtooth signal at said output electrodes during the trace periods and to cause reversal of the conducting states thereof upon the initiation of each of the retrace periods, said reversal of the conducting states of said first and second transistors causing said deflection winding to provide high amplitude retrace pulses at said output electrodes of said first and second transistors;

a diode and a resistor serially connected between circuit ground and said one end of said deflection winding for providing a current path for currents generated by said retrace pulses; and a second diode connected between the output electrode of said second transistor and said one end of said deflection winding for preventing said retrace pulses from damaging said second transistor.

2. In a television receiver having a cathode ray tube, a signal receiver for providing a video signal to said cathode ray tube, and a deflection yoke having a deflection winding associated with said cathode ray tube for deflecting an electron beam therein, improved deflection circuitry comprising: means connected to said signal receiver for generating a signal with a sawtooth waveform;

amplifier means having an input circuit connected to said means for generating a signal with a sawtooth waveform, first and second push-pull amplifier sections connected between a common junction and first and second output terminals, and first and second output transistors each having control electrodes connected to said first and second output terminals and output electrodes, and deflection winding being connected in circuit with said output electrodes; and feedback means having a first impedance means connected between said output electrodes of said first and second output transistors and said common junction of said first and second amplifier sections for providing direct current feedback to said common junction and a second impedance means connected in circuit with said deflection winding and said common junction for providing a feedbck signal to said common junction for opposing transients varying at a rate substantially less than the rate of scanning said cathode ray tube.

3. Deflection circuitry as defined in claim 2 wherein said second impedance means is a capacitor.

4. Deflection circuitry as defined in claim 3 wherein said first impedance means includes a bypass capacitor for supressing signals at the scanning rate and for passing signals at the transient rate.

5. In a television receiver having a cathode ray tube and a deflection winding associated therewith for deflecting an electron beam in said cathode ray tube, improved deflection circuitry comprising:

means for generating a signal with a sawtooth waveform;

a source of energizing potential having first and second terminals;

first and second output transistors connected in series between said first and second terminals of said source and having output electrodes connected to said deflection winding;

a monolithic integrated circuit including an input circuit connected to said means for generating a signal, a pushpull amplifier having a first section connected between said input circuit and a control electrode of said first output ransistor and a second section connected between said input circuit and a control electrode of said second output transistor, and first and second external connections for application of energizing potentials to said first and second sections, respectively; and first, second, and third impedance means serially connected between said first and second terminals of said source, the junction between said first and second impedance means being connected to said first external connection of said monolithic integrated circuit and the junction between said second and third impedance means being connected to said second external connection whereby the power dissipation of said push-pull amplifier is lowered.

6. Deflection circuitry as defined in claim 5 wherein said first, second, and third impedance means are first, second, and third resistors, respectively.

7. Deflection circuitry as defined in claim 5 wherein said first and second sections of said push-pull amplifier have a common junction, said deflection circuitry further including feedback means having fourth impedance means connected between said output electrodes of said first and second output transistors and said common junction of said first and second sections for providing direct current feedback to said common junction and fifth impedance means connected between said deflection winding and said common junction for providing a feedback signal to said common junction for opposing transients varying at a rate substantially less than the rate of scanning said cathode ray tube.

8. Deflection circuitry as defined in claim 7 wherein said fifth impedance means is a capacitor connected between a second end of said deflection winding and said fourth impedance means.

9. Deflection circuitry as defined in claim 8 wherein said fourth impedance means includes bypass capacitor for suppressing signals at the scanning rate and for passing signals at the transient rate.

10. Deflection circuitry as defined in claim 5 wherein said first and second sections of said push-pull amplifier control the conduction of said first and second output transistors, respectively, to provide a generally sawtooth signal to said deflection winding during trace periods of the scanning of said cathode ray tube and to cause reversal of the conducting states of said first and second output transistors upon the initiation of each of the retrace periods to cause said deflection winding to provide high amplitude retrace pulses at said output electrodes of said first and second output transistors, and said deflection circuitry further includes unidirectional conduction means connected in circuit with said deflection winding for providing a current path for currents generated by said retrace pulses.

11. Deflection circuitry as defined in claim 10 wherein said unidirectional conduction means is a diode and a resistor serially connected between circuit ground and said deflection winding.

12. Deflection circuitry as defined in claim 5 wherein said second section of said push-pull amplifier includes a third transistor connected intermediate an input stage of said second section and said second terminal of said source, said control electrode of said second output transistor is connected to an emitter of a driver transistor of said second section, a resistanc means is connected between a base of said driver transistor and a potential reference, said control electrode of said second output transistor is connected to a first intermediate point of said resistance means, and a control electrode of said third transistor is connected to a second intermediate point of said resistance means for compensating for off-set voltages of said second output transistor and said third transistor.

13. Deflection circuitry as defined in claim 12 wherein first and second resistors are connected between emitters of said second output transistor and said third transistor, respectively, and said second terminal of said source whereby the ratio of the currents flowing through said second output transistor and said third transistor is substantially equal to the ratio of said first and second resistors.

14. Deflection circuitry as defined in claim 12 wherein said first section of said push-pull amplifier includes a fourth transistor connected intermediate an input stage of said first section and said first terminal of said source, said control electrode of said first output transistor is connected to an emitter of a driver transistor of said first section, a second resistance means is connected between a base of said driver transistor of said first section and a second potential reference, said control electrode of said first output transistor is connected to a first intermediate point of said second resistance means, and a control electrode of said fourth transistor is connected to a second intermediate point of said second resistance means for compensating for off-set voltages of said first output transistor and said fourth transistor.

15. Deflection circuitry as defined in claim 14 wherein first and second resistors are connected between emitters of said first output transistor and said fourth transistor, respectively, and said first terminal of said source whereby the ratio of the currents flowing through said first output transistor and said fourth transistor is substantially equal to the ratio of said first and second resistors.

16. Deflection circuitry as defined in claim 5 wherein said monolithic integrated circuit includes a blanking circuit connected to a driver transistor of one of said first and second sections and a video amplifier connected to said cathode ray tube for providing blanking pulses to said video amplifier during retrace periods of the scanning of said cathode ray tube.

* * * * *